UNITED STATES PATENT OFFICE.

GEORGE W. PRESSELL, OF PHILADELPHIA, PENNSYLVANIA, ASSIGNOR TO E. F. HOUGHTON & CO., OF PHILADELPHIA, PENNSYLVANIA, A CORPORATION OF PENNSYLVANIA.

CEMENTATION COMPOUND AND METHOD OF MAKING SAME.

1,269,957.         Specification of Letters Patent.         Patented June 18, 1918.

No Drawing.         Application filed March 12, 1917.   Serial No. 154,319.

*To all whom it may concern:*

Be it known that I, GEORGE W. PRESSELL, a citizen of the United States, residing in Philadelphia, Pennsylvania, have invented certain Improvements in Cementation Compounds and Methods of Making Same, of which the following is a specification.

This invention relates to the art of cementation by dry packing and more particularly has to do with a novel cementation compound as well as with the process of making the same.

One object of the invention is to provide a compound for use in cementation, which shall be of such a nature that in addition to being available for repeated use, it has no tendency to pack or separate into its constituent ingredients when jarred or shaken.

As a typical example of a compound made in accordance with my invention I first place in a suitable mixing machine one hundred pounds of cementing material such as coarse charcoal, in the shape of pieces capable of passing through a quarter inch mesh sieve, and thereafter add energizing material in the form of thirteen pounds of sodium carbonate and two and one-half pounds of barium carbonate. Said materials are thoroughly mixed whereby the charcoal is covered or coated with energizing material frictionally adherent thereto, and thereafter while the machine is still in operation I add a binder in the form of eight gallons of waste sulfite liquor of a syrupy consistency and continue to agitate and mix thoroughly.

I then make a dry mixture of more finely divided charcoal and the energizers above referred to, in proportions approximately of sixty-five parts by weight of charcoal and thirty-five parts of the carbonates, and this mixture I add to the pasty mass in the mixer already described, in such proportion that the dry mixture constitutes twenty-five to fifty per cent. of the entire mass.

The continued operation of the mixing machine results in its contents assuming the form of granules conforming roughly to the shapes of the coarse charcoal grains which constitute their nuclei and these granules are then dried at a temperature not exceeding 250° F.

The granules thus formed are of varying sizes, for the most part about one-quarter inch in greatest dimension and sufficiently hard to provide the required firm support for the metal objects undergoing the cementation or case-hardening process.

In place of either the granular or the more finely divided charcoal, I may use other carburizing agents, such, for example, as charred bone, petroleum carbon, or coke, or mixtures of said materials, and other carbonates may be employed, such, for example, as calcium carbonate.

While I preferably employ sulfite liquor as my binder, it is to be understood that other substances, such as molasses, glucose and tar, having the quality of forming a binding film around the grains which will cause these to retain their forms when exposed to the temperature to which articles are heated during case-hardening, may be employed without departing from my invention.

By thoroughly mixing the carbon granules with the energizers before the binder is added, the energizer is uniformly distributed and caused to become closely incorporated not only on the exterior of the grains but in the pores thereof, so that the re-action with the charcoal granule is not interfered with by the subsequent addition of the binder. So far as I am aware, it has not heretofore been proposed to furnish an energized carbon grain with a coating of carbon material which is itself energized, and I have discovered that the product described has important advantages of increased life and uniformity.

I claim:—

1. Carburizing material comprising a carbonaceous base grain having energizing material frictionally adherent thereto and a coating of a highly active carburizing agent intimately bonded therewith.

2. Carburizing material comprising a carbonaceous base grain having a dry energizer intimately incorporated therewith and frictionally adherent thereto, said energized grain also having a permanent coating of energized carbon material bound thereto.

3. Carburizing material consisting of a base carbon grain, an energizer frictionally adherent thereto, and a mixture of carbon material and an energizer bound to and coating the exterior of said energized base grain.

4. Carburizing material comprising granular charcoal approximating one-quarter inch in size intimately associated with approximately fifteen per cent. by weight of a suitable carbonate mixture frictionally adherent thereto and constituting an energizer, said energized grains having a mixture of more finely divided charcoal and alkaline carbonates secured thereto by a suitable binder; the last named mixture approximating in weight twenty-five to fifty per cent. of the weight of said granular charcoal.

5. The herein described method of making carburizing material, which consists in mixing granules of carbon material with suitable energizing agents in a dry and finely powdered state, thoroughly mixing said energized carbonaceous material with a tacky binder, adding a mixture of finely divided carbonaceous material and an energizing agent, thoroughly mixing the several ingredients, and drying the material in granular form.

In witness whereof I affix my signature.

GEORGE W. PRESSELL.